United States Patent
Charrat

(10) Patent No.: US 9,667,339 B2
(45) Date of Patent: May 30, 2017

(54) SATELLITE TELECOMMUNICATION SYSTEM AND METHOD WITH MULTISPOT COVERAGE AND WITH VARIABLE CAPACITY DISTRIBUTION

(71) Applicant: THALES, Courbevoie (FR)

(72) Inventor: Bernard Charrat, Toulouse (FR)

(73) Assignee: THALES, Courbevoie (FR)

( * ) Notice: Subject to any disclaimer, the term of this patent is extended or adjusted under 35 U.S.C. 154(b) by 119 days.

(21) Appl. No.: 14/682,885

(22) Filed: Apr. 9, 2015

(65) Prior Publication Data

US 2015/0295637 A1  Oct. 15, 2015

(30) Foreign Application Priority Data

Apr. 11, 2014 (FR) .................................... 14 00883

(51) Int. Cl.
*H04J 1/08* (2006.01)
*H04J 1/10* (2006.01)
*H04B 7/185* (2006.01)
*H04B 7/204* (2006.01)

(52) U.S. Cl.
CPC ..... *H04B 7/18582* (2013.01); *H04B 7/18515* (2013.01); *H04B 7/18539* (2013.01); *H04B 7/2041* (2013.01); *H04J 1/08* (2013.01); *H04J 1/10* (2013.01)

(58) Field of Classification Search
CPC ....................................................... H04B 7/18
See application file for complete search history.

(56) References Cited

U.S. PATENT DOCUMENTS

| 6,181,450 B1* | 1/2001 | Dishman ............ H04B 7/18521 370/281 |
| 6,442,148 B1 | 8/2002 | Adams et al. |
| 2007/0002430 A1* | 1/2007 | Mitchell ............. H04B 10/296 359/341.4 |
| 2009/0023384 A1* | 1/2009 | Miller .................. H04B 7/2041 455/12.1 |
| 2009/0243719 A1 | 10/2009 | Voisin et al. |
| 2009/0270088 A1* | 10/2009 | Fenech .............. H04B 7/18515 455/427 |
| 2011/0189947 A1 | 8/2011 | Miller |

(Continued)

FOREIGN PATENT DOCUMENTS

WO  WO2008017699 A1  2/2008

*Primary Examiner* — Xavier Szewai Wong
(74) *Attorney, Agent, or Firm* — Baker Hostetler LLP

(57) ABSTRACT

A telecommunication system comprises channels connected to a spot generation device, each spot being able to cover a dedicated user cell. All the channels have an identical bandwidth. The spot generation device comprises channel amplifiers with variable gain and with constant output power dedicated to each channel, the output power levels of all the channel amplifiers being constant and identical, frequency demultiplexers respectively connected to the channel amplifiers and intended to split the bandwidth assigned to each channel into N sub-bands having the same width corresponding to N carriers having different frequencies, a device for selecting and distributing all the carriers between the spots, and frequency combiners respectively dedicated to each spot, the number of carriers assigned to each spot being variable from one spot to another spot according to the needs of the corresponding users.

9 Claims, 10 Drawing Sheets

(56) References Cited

U.S. PATENT DOCUMENTS

2011/0317620 A1* 12/2011 Voisin .................. H04B 7/2041
370/316
2012/0164941 A1 6/2012 Park
2013/0009809 A1 1/2013 Bert et al.

* cited by examiner

| Spot 1 | Spot 2 | Spot 3 | Spot 4 |
|---|---|---|---|
| 0 | 4 | 4 | 4 |
| 1 | 3 | 4 | 4 |
| 1 | 4 | 3 | 4 |
| 1 | 4 | 4 | 3 |
| 2 | 2 | 4 | 4 |
| 2 | 3 | 3 | 4 |
| 2 | 3 | 4 | 3 |
| 2 | 4 | 2 | 4 |
| 2 | 4 | 3 | 3 |
| 2 | 4 | 4 | 2 |
| 3 | 1 | 4 | 4 |
| 3 | 2 | 3 | 4 |
| 3 | 2 | 4 | 3 |
| 3 | 3 | 2 | 4 |
| 3 | 3 | 3 | 3 |
| 3 | 3 | 4 | 2 |
| 3 | 4 | 1 | 4 |
| 3 | 4 | 2 | 3 |
| 3 | 4 | 3 | 2 |
| 3 | 4 | 4 | 1 |
| 4 | 0 | 4 | 4 |
| 4 | 1 | 3 | 4 |
| 4 | 1 | 4 | 3 |
| 4 | 2 | 2 | 4 |
| 4 | 2 | 3 | 3 |
| 4 | 2 | 4 | 2 |
| 4 | 3 | 1 | 4 |
| 4 | 3 | 2 | 3 |
| 4 | 3 | 3 | 2 |
| 4 | 3 | 4 | 1 |
| 4 | 4 | 0 | 4 |
| 4 | 4 | 1 | 3 |
| 4 | 4 | 2 | 2 |
| 4 | 4 | 3 | 1 |
| 4 | 4 | 4 | 0 |

FIG.4

| Spot 1 | Spot 2 | Spot 3 | Spot 4 |
|---|---|---|---|
| 0 | 0 | 4 | 4 |
| 0 | 1 | 3 | 4 |
| 0 | 1 | 4 | 3 |
| 0 | 2 | 2 | 4 |
| 0 | 2 | 3 | 3 |
| 0 | 2 | 4 | 2 |
| 0 | 3 | 1 | 4 |
| 0 | 3 | 2 | 3 |
| 0 | 3 | 3 | 2 |
| 0 | 3 | 4 | 1 |
| 0 | 4 | 0 | 4 |
| 0 | 4 | 1 | 3 |
| 0 | 4 | 2 | 2 |
| 0 | 4 | 3 | 1 |
| 1 | 0 | 3 | 4 |
| 1 | 0 | 4 | 3 |
| 1 | 1 | 2 | 4 |
| 1 | 1 | 3 | 3 |
| 1 | 1 | 4 | 2 |
| 1 | 2 | 1 | 4 |
| 1 | 2 | 3 | 2 |
| 1 | 2 | 4 | 1 |
| 1 | 3 | 1 | 3 |
| 1 | 3 | 2 | 2 |
| 1 | 3 | 3 | 1 |
| 1 | 3 | 4 | 0 |
| 1 | 4 | 0 | 3 |
| 1 | 4 | 1 | 2 |
| 1 | 4 | 2 | 1 |
| 1 | 4 | 3 | 0 |
| 2 | 0 | 2 | 4 |
| 2 | 0 | 3 | 3 |
| 2 | 0 | 4 | 2 |
| 2 | 1 | 1 | 4 |
| 2 | 1 | 2 | 3 |
| 2 | 1 | 3 | 2 |
| 2 | 1 | 4 | 1 |
| 2 | 2 | 0 | 4 |
| 2 | 2 | 1 | 3 |
| 2 | 2 | 2 | 2 |
| 2 | 2 | 3 | 1 |
| 2 | 2 | 4 | 0 |
| 2 | 3 | 0 | 3 |
| 2 | 3 | 1 | 2 |
| 2 | 3 | 2 | 1 |
| 2 | 3 | 3 | 0 |
| 2 | 4 | 0 | 2 |
| 2 | 4 | 1 | 1 |
| 2 | 4 | 2 | 0 |
| 3 | 0 | 1 | 4 |
| 3 | 0 | 2 | 3 |
| 3 | 0 | 3 | 2 |
| 3 | 0 | 4 | 1 |
| 3 | 1 | 0 | 4 |
| 3 | 1 | 1 | 3 |
| 3 | 1 | 2 | 2 |
| 3 | 1 | 3 | 1 |
| 3 | 1 | 4 | 0 |
| 3 | 2 | 0 | 3 |
| 3 | 2 | 1 | 2 |
| 3 | 2 | 2 | 1 |
| 3 | 2 | 3 | 0 |
| 3 | 3 | 0 | 2 |
| 3 | 3 | 1 | 1 |
| 3 | 3 | 2 | 0 |
| 3 | 4 | 0 | 1 |
| 3 | 4 | 1 | 0 |
| 4 | 0 | 0 | 4 |
| 4 | 0 | 1 | 3 |
| 4 | 0 | 2 | 2 |
| 4 | 0 | 3 | 1 |
| 4 | 0 | 4 | 0 |
| 4 | 1 | 0 | 3 |
| 4 | 1 | 1 | 2 |
| 4 | 1 | 2 | 1 |
| 4 | 1 | 3 | 0 |
| 4 | 2 | 0 | 2 |
| 4 | 2 | 1 | 1 |
| 4 | 2 | 2 | 0 |
| 4 | 3 | 0 | 1 |
| 4 | 3 | 1 | 0 |
| 4 | 4 | 0 | 0 |

FIG.6

| Spot 1 | Spot 2 | Spot 3 |
|--------|--------|--------|
| 0 | 3 | 3 |
| 1 | 2 | 3 |
| 1 | 3 | 2 |
| 2 | 1 | 3 |
| 2 | 2 | 2 |
| 2 | 3 | 1 |
| 3 | 0 | 3 |
| 3 | 1 | 2 |
| 3 | 2 | 1 |
| 3 | 3 | 0 |

SATELLITE TELECOMMUNICATION SYSTEM AND METHOD WITH MULTISPOT COVERAGE AND WITH VARIABLE CAPACITY DISTRIBUTION

CROSS-REFERENCE TO RELATED APPLICATION

This application claims priority to foreign French patent application No. FR 1400883, filed on Apr. 11, 2014, the disclosure of which is incorporated by reference in its entirety.

FIELD OF THE INVENTION

The present invention relates to a satellite telecommunication system and method with multispot coverage and with variable capacity distribution. It applies more particularly to the field of space applications such as satellite telecommunications for missions requiring dynamic adaptation of the capacity assigned to each spot.

BACKGROUND

The current satellite telecommunication systems with multispot coverage generally have a capacity (frequency band and power assigned to each spot) which is fixed for each spot and which cannot therefore be modified after the satellite has been launched. In particular, it is not possible to reallocate unused traffic capacity from one spot to another spot during the life of the satellite. The fixed distribution of the capacity is all the more detrimental since the lifespan of a satellite is very long (of the order of fifteen years) and it is therefore difficult for an operator to estimate trends, over time, of the capacity needs corresponding to each area of the coverage. This potentially leads to problems of overcapacity in certain areas and of under capacity in other areas of the coverage.

There are telecommunication systems which include a flexibility mechanism, but these systems use either digital processors or processors operating in intermediate frequency IF band which present the drawbacks of being costly, complex and limited in bandwidth.

SUMMARY OF THE INVENTION

One aim of the invention is to remedy the drawbacks of the known satellite telecommunication systems with multispot coverage by introducing flexibility in the distribution of capacity assigned to each spot in the missions with multispot coverage, with a low impact on the capacity and the overall cost of the system, without using any digital processor or IF processor.

Another aim of the invention is to make it possible to progressively deploy gateway stations by allowing operation with reduced capacity during the launch phase of the telecommunication system which can consequently be carried out with a smaller number of gateway stations deployed on the ground.

For this, the invention relates to a satellite telecommunication system with multispot coverage and with variable capacity distribution, comprising at least one gateway station, users located in different cells evenly distributed in a geographic coverage area, at least one repeater mounted on board a satellite and suitable for relaying radiofrequency signals between the gateway station and the users, the repeater comprising a plurality of reception channels connected to at least one spot generation device, each spot being able to cover a dedicated user cell. All the reception channels have an identical bandwidth and the spot generation device comprises channel amplifiers with variable gain and with constant output power and able to equalize the power levels of all the reception channels, the output power levels of all the channel amplifiers being constant and identical for all the channels, frequency demultiplexers respectively connected at the output of the channel amplifiers and intended to split the bandwidth assigned to each channel into N sub-bands having a same width and corresponding to N carriers having different frequencies, at least one device for selecting and distributing all the carriers between all the spots, two adjacent carriers in a reception channel being assigned to two different spots, and frequency combiners respectively dedicated to each spot to combine the carriers selected for the corresponding spot, the number of carriers assigned to each spot being variable from one spot to another spot as a function of the needs of the corresponding users.

Advantageously, the device for selecting and distributing carriers comprises two-position switches and three-position switches, the switches selectively linking, depending on their position, each carrier to a frequency combiner chosen from all the frequency combiners.

Advantageously, the telecommunication system with multispot coverage and with variable capacity distribution further comprises frequency converters dedicated to each reception channel and intended to convert reception frequency bands into transmission frequency bands, the channel amplifiers with variable gain and with constant output power being connected at the output of the frequency converters.

Advantageously, each spot comprises a dedicated number of carriers between 0 and N inclusive and the average number of carriers per spot is predefined and less than N.

Advantageously, the spots can be associated in a number of different groups. In this case, the spot generation device comprises a number of independent devices for selecting and distributing the carriers, each selection and distribution device being dedicated to a group of spots.

The different groups of spots can comprise the same number of spots or a different number of spots.

Each group of spots can comprise a same average number of carriers per spot.

The invention relates also to a satellite telecommunication method with multispot coverage and with variable capacity distribution between at least one gateway station and users located in different cells evenly distributed in a geographic coverage area, the method consisting, on board the satellite, in relaying radiofrequency signals received over reception channels, between the gateway station and the users. The method consists in assigning a same bandwidth to each reception channel, in equalizing the power levels of all the reception channels, in splitting the bandwidth assigned to each reception channel into N sub-bands having a same width and corresponding to N carriers having different frequencies, in selecting and in distributing all the carriers between all the spots, two adjacent carriers in a reception channel being assigned to two different spots, and, for each spot, in combining the corresponding selected carriers, the number of carriers assigned to each spot being variable from one spot to another spot according to the needs of the corresponding users.

Advantageously, the spots can be associated in a number of mutually independent different groups. In this case, the carriers are selected and distributed in each group of spots, independently of the other groups of spots.

BRIEF DESCRIPTION OF THE DRAWINGS

Other particular features and advantages of the invention will become clearly apparent hereinafter in the description given as a purely illustrative and nonlimiting example, with reference to the attached schematic drawings which represent:

FIG. 4: a table illustrating all the possible combinations corresponding to a distribution of 12 carriers between four spots, according to the invention;

FIG. 6: a table illustrating all the possible combinations corresponding to a distribution of eight carriers between four spots, according to the invention;

DETAILED DESCRIPTION

The platform for a telecommunication satellite is dimensioned to deliver a maximum overall electrical power which is supplied by solar panels associated with batteries. The greater the power to be supplied, the greater the dimensions of the solar panels, of the batteries, of the satellite and the more the cost of the satellite and of the launch increases. This power is defined and fixed before the satellite is launched and can no longer then be modified. Similarly, the dimensioning of the payload mounted on board the satellite, notably the number of communication channels intended to relay radiofrequency signals between gateway stations and users situated in a coverage area, is defined before the satellite is launched and cannot then be modified.

Figure 1:
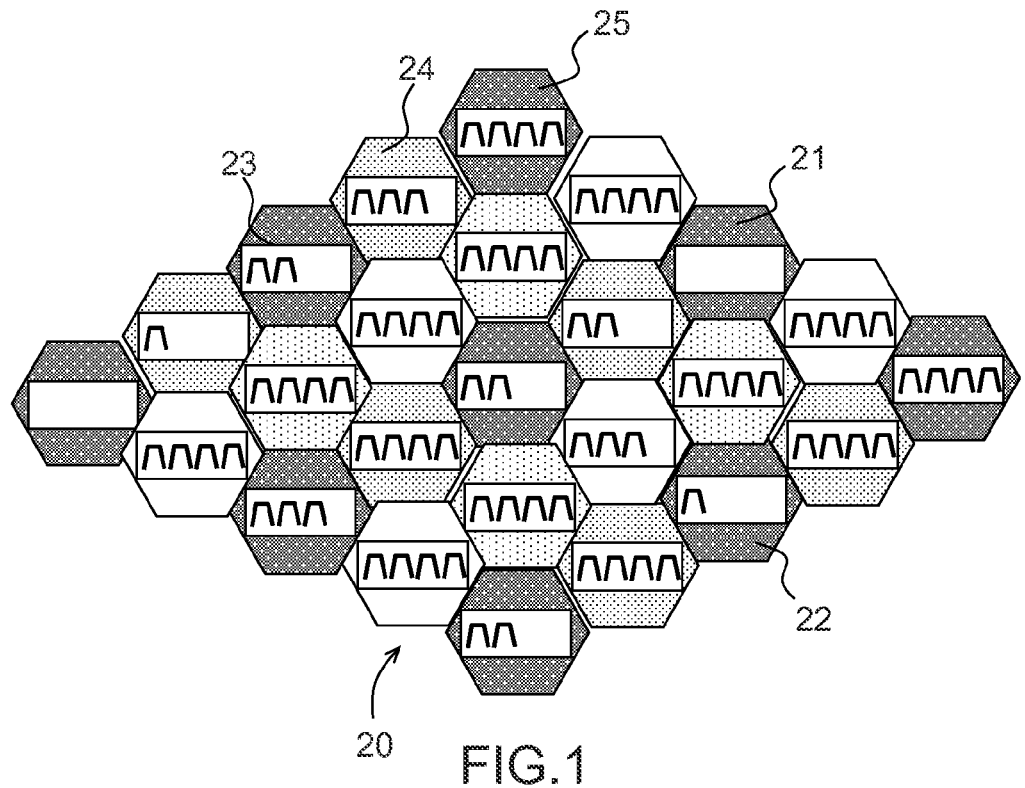
FIG. 1: a diagram of an exemplary distribution of the capacity of a telecommunication satellite in a multispot coverage area, according to the invention.

The diagram represented in FIG. 1 is an example of coverage area 20 divided into a number of cells 21, 22, 23, 24, . . . , evenly distributed in the coverage area 20 and intended to be illuminated by respective spots generated in a repeater on board the satellite. The spots contain radiofrequency signals which are routed to the users located in the different cells by dedicated communication channels of the telecommunication system. The transmission frequency band of each spot and the polarization of the radiofrequency signal assigned to each spot are defined according to a conventional, so-called four-colour, scheme, the different colours corresponding to frequency band and polarization pairings of different values, the spots having the same colour reusing the same frequency and polarization values. Generally, all the channels have a same bandwidth and a same power, and therefore a same capacity.

To introduce capacity flexibility into the different cells of the coverage area illuminated by the different spots, the invention consists in assigning each dedicated channel a spot having the same bandwidth DF and the same power density, but in splitting the bandwidth DF into N different carriers P1, P2, P3, . . . PN having the same bandwidth DP, in which DP=DF/N, corresponding to different frequencies, and in varying the number of carriers assigned from one spot to another spot according to the needs in terms of capacity of the clients served by the corresponding spots. For the carriers not to be disturbed, between spots having the same colour, the same power level and therefore the same bandwidth DP must be assigned to each carrier. Unlike the existing systems that use digital processors, it is the carriers which are assigned to each spot by choosing their number but not their frequency within the band of the spot.

Figure 2:
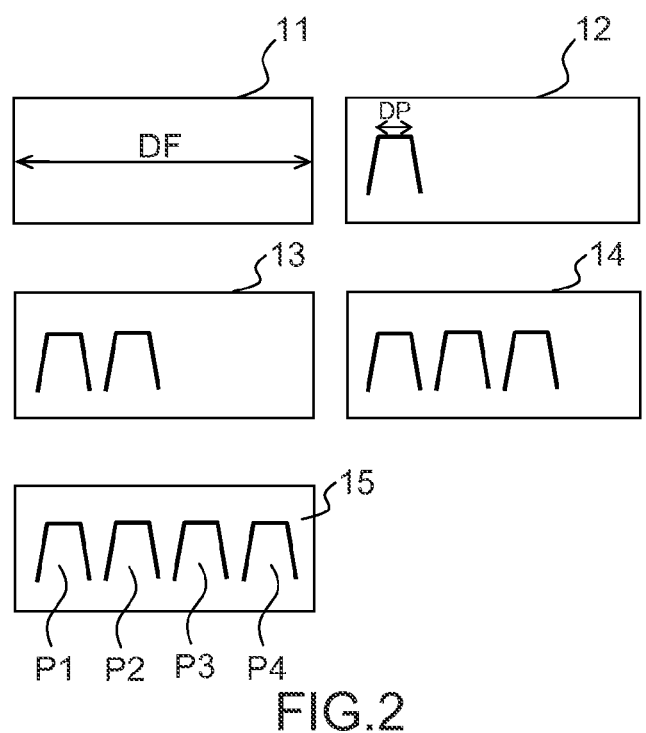
FIG. 2: a diagram, illustrating an exemplary variable assignment, of zero to four carriers, between different channels, with constant power per carrier, according to the invention.

For example, in FIG. 2, the bandwidth DF is split into four different carriers P1, P2, P3, P4 having the same bandwidth DP. Each spot is powered by different carriers distributed by sub-channels, and a quarter of the maximum power is assigned to each carrier, the maximum power corresponding to four carriers. Thus, when a power of 100 W is assigned to the bandwidth DF, the power assigned to each carrier is equal to 25 W. The number of carriers assigned to each spot can take different values for different spots. In the example of FIG. 2, the channel 11 dedicated to a first spot comprises zero carrier, that is to say no power is assigned to this first spot. This first spot is intended to cover a cell 21 of the coverage where there are no clients, for example a cell in which the service is not yet offered. The second channel 12 dedicated to a second spot intended to cover the cell 22 comprises a single carrier and it is therefore assigned a power of 25 W. The third channel 13 dedicated to a third spot intended to cover the cell 23 and the fourth channel 14 dedicated to a fourth spot intended to cover the cell 24 respectively comprise two and three carriers, which corresponds to respective powers of 50 W and of 75 W. The last channel 15 dedicated to a fifth spot 25 comprises four carriers and a power of 100 W. The maximum number N of carriers per spot is chosen as a function of the capacity granularity that the operator wants to assign to the different spots serving the different cells of the coverage area.

Depending on the needs of the clients identified by the operator, the cost and the capacity desired by the operator, the bandwidth DF assigned to each channel is therefore split into N different contiguous sub-bands having the same width DP corresponding to N different carriers, in which N is an integer number greater than one, and an average number K of carriers per spot is chosen, in which K is an integer number less than N, the average number of carriers per spot multiplied by the total number of spots corresponding to the maximum capacity of the telecommunication system. The invention then consists in defining a device for selecting and distributing the carriers between the spots that makes it possible to equalize the powers of the carriers then distribute the different carriers between the spots according to the needs in terms of capacity of each cell of the coverage area. This makes it possible to activate each spot with a bandwidth and a power that are specific to each spot and appropriate to the real needs of the clients situated in each cell and to limit the system cost by limiting the unused capacity.

In the diagrams of FIGS. 1 and 2, the bandwidth DF assigned to each channel 11, 12, 13, 14, 15 is split into four different sub-bands corresponding to four different carriers P1, P2, P3, P4 each occupying a quarter of the bandwidth and the distribution of the carriers is, on average, three carriers per spot. Thus, it is possible to modulate the capacity assigned to each of the spots to which zero carrier or one carrier or two carriers or three carriers or four carriers can be assigned depending on the needs of the corresponding cells of the coverage. In this example, the average number of carriers per spot is chosen to be equal to three, the bandwidth capacity of each spot is therefore, on average, three quarters used and a quarter of the total bandwidth capacity remains available and accessible for a second satellite which can be launched subsequently to increase the total capacity of the system if the needs change. In this example, the initial configuration of the telecommunication system upon the launching of the satellite does not therefore require the provision of a power corresponding to four carriers for each spot but does however make it possible to provide four carriers in the heavily used spots, which makes it possible to limit the unused capacity.

In the case of a change in the needs in terms of capacity in a number of cells of the coverage, the distribution of the carriers is not fixed but can be dynamically adapted throughout the life of the satellite to increase the capacity of some cells and reduce the capacity of other cells, the average number of carriers per spot, and therefore the total number of carriers to be distributed, remaining constant.

In the case where the capacity in terms of total power becomes inadequate to cover all the needs of the users of the coverage area, it is then possible to increase the total capacity of the telecommunication system by launching a second telecommunication satellite and by assigning additional carriers to the cells of the coverage for which the capacity in terms of power has to be increased.

Similarly, when the service is initialized, the system according to the invention can operate with a reduced number of carriers but a number that is distributed over all the spots which makes it possible for the system to be able to operate with a reduced number of gateway stations to serve all the user cells. After the system start up phase, if the needs of the clients increase, additional connections can be added to the system to allow operation with an average of K carriers per spot.

The choice of the total number of spots, of the number N of different carriers in the bandwidth of each spot and of the average number K of carriers per spot is set initially and can no longer be modified after the satellite has been launched.

Obviously, the number N of different carriers can be chosen to be different from four and the average number K of carriers per spot can be chosen to be different from three. When the number N of carriers in the bandwidth increases, the granularity of the capacity offered for each spot increases, which allows for a better distribution of the capacity, but, the more the number N of carriers in the bandwidth increases, the more the complexity, the cost and the weight of the architecture of the payload increases.

Another important parameter of the invention is that the distribution of the capacity is produced by considering the spots by groups of a number of spots, each group being able to comprise the same number C of spots or a different number, in which C is less than or equal to the total number of spots to be produced. Thus, in a group of C spots, K×C carriers are to be distributed between the C spots, according to the needs defined by the user, with, for each spot, between 0 and N carriers. The higher C becomes, the more freedom the user has in the distribution of the capacity, but the more the complexity and therefore the cost increases. It should be noted that, at most, when the telecommunication system has to operate in two different reception frequency bands Fr1, Fr2, the maximum size of a group of spots is equal to half the total number of spots because the capacity is distributed between spots that use the same frequency band.

Figure 3:
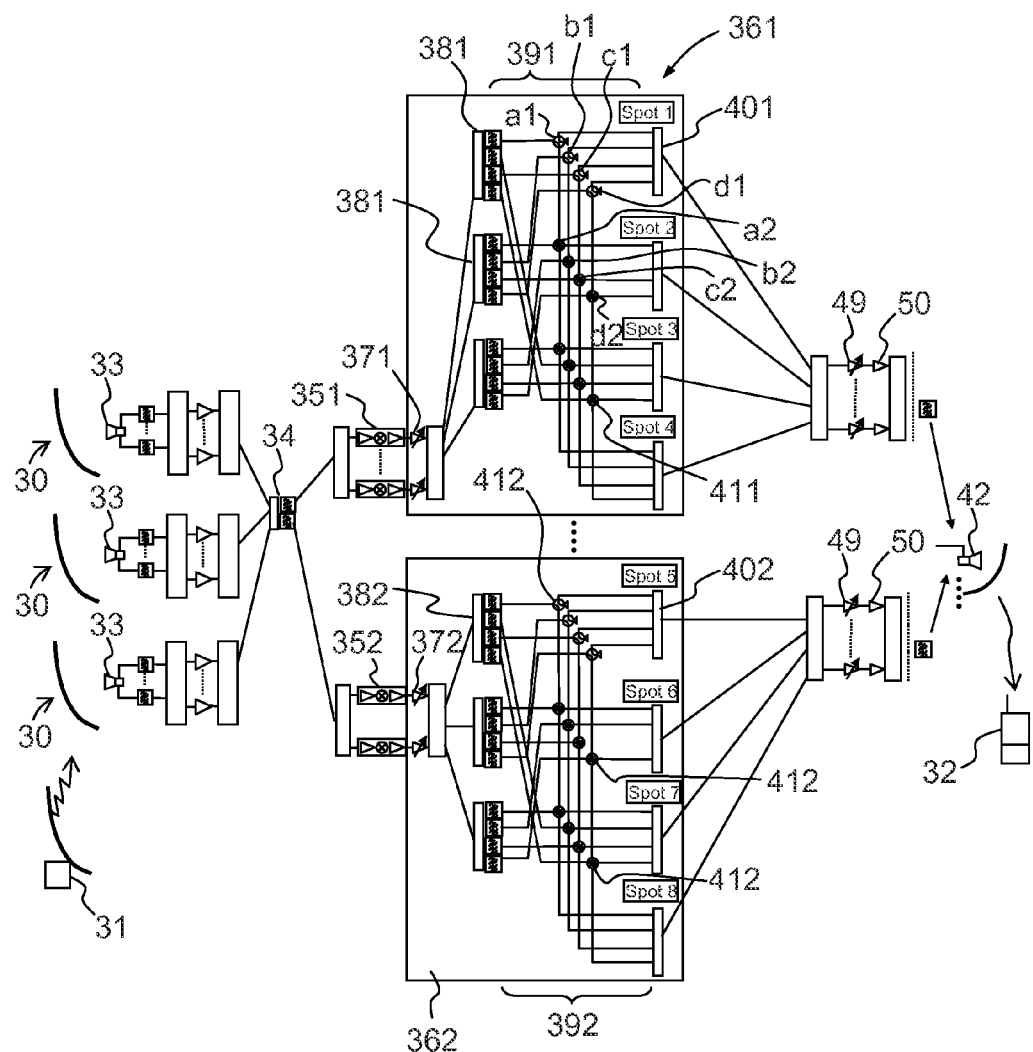
FIG. 3: a diagram of an exemplary architecture of a telecommunication system illustrating a first exemplary spot generation device corresponding to a distribution of 12 carriers between four spots, according to the invention.

FIG. 3 is a diagram illustrating an exemplary architecture of a satellite telecommunication system corresponding to a service mission comprising communication links between a repeater mounted on board the satellite and a plurality of different gateway stations for serving user spots. All the gateway stations operate in the same frequency bands. In this diagram, only the go section of the repeater is represented, which corresponds to the routing of the signals originating from the gateway stations to the different user cells. This example relates to the case in which the number of carriers N per bandwidth DF is chosen to be equal to four, the average number K of carriers per spot is chosen to be equal to three and the size C of the group of spots in which the distribution of capacity is applied is equal to four for all the groups: N=4, K=3, C=4.

As represented in FIG. 3, on board the satellite, the repeater comprises one or more transmission and reception antennas 30 able to relay radiofrequency signals between one or more gateway stations 31 and users 32. Each antenna 30 can, as is known, comprise a reflector and transmission and reception feeds 33. Each gateway station operates in two frequency bands, Fr1, Fr2 respectively high and low, and in two different polarizations POL1, POL2. For each gateway station, two distinct signals corresponding to two different polarizations are received by a dedicated reception feed 33, filtered, then amplified by low-noise amplifiers. Each of the high and low frequency bands received from the different gateway stations are then divided into two distinct bands in diplexers 34 to obtain four distinct signals (POL1 Fr1, POL2 Fr1, POL1 Fr2, POL2 Fr2) for each gateway station. For each station, there is a diplexer for each polarization, therefore two different diplexers. For example, for a telecommunication station comprising six operational gateway stations, there are twelve diplexers and 24 different reception channels are obtained at the output of the twelve diplexers 34, out of which 12 channels correspond to the high frequency band Fr1 and 12 channels correspond to the low frequency band Fr2. If the bandwidth corresponding to each reception frequency band, respectively high and low, is 500 MHz, each channel is assigned a bandwidth DF equal to 500 MHz.

The 24 500 MHz channels corresponding to the two reception frequency bands, respectively high Fr1 and low Fr2, are respectively connected to 24 frequency converters 351, 352 intended to convert the two reception bands Fr1, Fr2 into the two corresponding transmission frequency bands F1 and F2, corresponding to the frequencies of the user spots.

According to the invention, after frequency conversion, the 24 channels are connected to the input of at least one spot generation device 361, 362. Since the 24 channels are not all powered by the same gateway station, their power level is not uniform from one channel to another channel and can change according to atmospheric conditions. To resolve this problem, according to the invention, the spot generation device 361, 362 comprises variable gain channel amplifiers 371, 372, respectively dedicated to each channel and intended to equalize the power levels of all the channels before generating the spots. The variable gain channel amplifiers 371, 372 are respectively connected to the output of the frequency converters 351, 352 and each channel amplifier 371, 372 has a controlled gain so as to maintain a constant output power that is predetermined and identical for all the channel amplifiers 371, 372 regardless of their input power level. At the output of the channel amplifiers 371, 372, the spot generation device 361, 362 comprises frequency demultiplexers 381, 382 ensuring the division of the bandwidth DF dedicated to each channel into N distinct sub-bands having the same bandwidth DP corresponding to N different carriers, and at least one device 391, 392 for selecting and distributing the carriers between the spots. A frequency combiner 401, 402 is dedicated to each spot, each frequency combiner 401, 402 ensuring the combining of the carriers selected and distributed on its inputs to generate a corresponding spot on its output. As in the example represented in FIG. 3, each bandwidth DF assigned to a channel can be subdivided into four different carriers having the same bandwidth DP, the different carriers being distributed by sub-channels. For example, DP can be equal to 125 MHz, but the invention is not limited to this exemplary embodiment and the number N of carriers can be different from four and, for example, equal to two, or to three, or to five, or to any other value greater than one.

According to the invention, the device 391, 392 for selecting and distributing carriers between the spots comprises a set of switches 411, 412 with two or three different positions, selectively linking, according to their position, all the carriers delivered as output from the frequency demultiplexers 381, 382 to the frequency combiners 40 intended to generate each spot. The switches 411, 412 can for example be electromechanical rotary switches and be produced in low-power coaxial technology or ferrite switches or electronic switches. Should the needs change regarding the distribution of the capacity between the different spots, the positions of the switches 411, 412 can be modified by remote control during the life of the satellite. The different carriers selected and distributed to the different frequency combiners 401, 402 by the switches 411, 412 are recombined by each frequency combiner 401, 402 to form beams corresponding to the different spots. The different beams formed at the output of each frequency combiner 401, 402 are then amplified by preamplifiers 49 and power amplifiers 50, then filtered, then the spots are transmitted to the users 32 by transmission feeds 42 of a multispot antenna.

According to the invention the operator can assign each spot a number of carriers between 0 and N but must observe the limit of the distribution within a group of C spots, this limit being equal to K×C carriers, K being the average number of carriers per spot. According to the invention, provision may also be made to minimize the loss of useful bandwidth, due to the need to provide a guard band between the different carriers, by ensuring a distribution of the carriers that guarantees the absence of the "multipaths" effect. For this, two adjacent carriers in one and the same reception channel cannot be assigned to the same spot.

In the example of FIG. 3, it is therefore possible to distribute the 48 carriers of the frequency band F1 between 16 different spots comprising an average of three carriers per spot, and to distribute, in the same way, the 48 carriers of the frequency band F2 between 16 other different spots. The distribution of the carriers is produced by considering the spots in groups of a size that can, for example, be 4 spots as in FIG. 3 but can also be extended to 8, or 16 spots, by increasing the complexity of carrier distribution functions respectively performed by the devices 391, 392 for selecting and distributing carriers. In the simplified diagram of FIG. 3, the distribution of the carriers is represented for two groups of four spots, but, to obtain 32 spots, eight groups of four different spots are needed. Consequently, obviously, six other devices 391, 392 for selecting and distributing carriers must be added to respectively feed the other six groups of four spots. The different groups of spots can comprise the same number of spots, but this is not mandatory. Each group of spots is independent of the other groups and the telecommunication system can comprise groups of four spots and one group of sixteen spots for example, for a mission comprising twenty spots. Moreover, in different groups of spots there may be a same average number of carriers per spot or different average numbers of carriers. For example, there may be groups comprising an average of three carriers per spot and groups comprising an average of two carriers per spot.

The more the size of the group of spots concerned includes a large number of spots, the more the flexibility of the telecommunication system increases but the more the number of switches and possible combinations increases and therefore the more the complexity of the corresponding system increases. The solution retained for the device for generating spots therefore results from a trade-off between the desired flexibility level and the resulting complexity level.

In the example of FIG. 3, the distribution of the different carriers between the spots is produced by associating the channels 351, 352 in groups of three which make it possible to form four different spots, each group of four spots observing the average of three carriers per spot. In this case, the four carriers of each group of three channels are distributed on the inputs of four different frequency combiners 401, 402 to form four different spots of 0, 1, 2 or 3 carriers according to the spots with an average of 3 carriers per spot in each group of four spots. Thus, according to this embodiment of the invention, the distribution of the carriers between the spots is produced in parallel for eight groups of four spots, by eight independent selection and distribution devices 391, 392, of which two corresponding respectively to the frequencies F1 and F2 are represented in FIG. 3. Selection and distribution device 391, 392 is the name given to all the switches 411, 412 and the associated connections involved in the distribution of the carriers for the generation of a group of spots.

One or more switches 411, 412 are linked between each output of a frequency demultiplexer 381, 382 and each input of a frequency combiner 401, 402 of the device for generating spots 361, 362. Each switch 411, 412 comprises an input port and two or three possible output ports. As an example, in FIG. 3, the arrangement of the connections shows that the four outputs of each frequency demultiplexer 381, 382 are connected to an input of a respective rotary switch 411, 412 and that the four inputs of each frequency combiner 401, 402 are connected to an output of a rotary switch 411, 412. The outputs of a switch 411, 412 can be linked directly to a frequency combiner 401, 402 or via a second switch. The different carriers which feed each spot are selected and assigned by the switches 411, 412 according to their position.

To reduce the width of the guard bands between two adjacent frequency bands, according to the invention, two adjacent frequency bands from one and the same frequency demultiplexer 381, 382 and therefore originating from one and the same reception channel, cannot be assigned to one and the same spot. Consequently, only two non-contiguous outputs of one and the same frequency demultiplexer, corresponding to two non-adjacent carriers, can be linked to one and the same frequency combiner. Any additional carriers which can be assigned to this same spot must originate from another frequency demultiplexer associated with the same group of spots. For example, in FIG. 3, each switch 411, 412 comprises two possible outputs respectively connected, either directly, or via another switch, to two different frequency combiners for the generation of two different spots of a group of four spots. Depending on its position, each switch 411, 412 can connect its input with its first or its second output, which makes it possible to select and assign the carriers to the four spots of the group according to the capacity requirements. Thus, for example, in FIG. 3, the switches 411 a1 and c1 whose inputs are respectively connected to two non-contiguous outputs of the first frequency demultiplexer 381, have a first output connected directly to the frequency combiner dedicated to the generation of the spot 1 and a second output connected to the frequency combiner dedicated to the generation of the spot 2 via another respective switch 411, respectively a2, c2. The switches 411 b1 and d1 whose inputs are respectively connected to two non-contiguous outputs of the second frequency demultiplexer, have a first output connected directly to the frequency combiner dedicated to the spot 1 and a second output linked to the frequency combiner dedicated to the spot 2 via another respective switch 411 b2, d2. The fourth spot is fed by the carriers which have not been assigned to the three other spots of the same group and can comprise 0, 1, 2 or 3 carriers depending on the positions retained for each switch 411 linked to the output of each frequency demultiplexer 381 associated with the group of spots concerned. For each group of four spots, the same connection scheme can be reproduced between the outputs of the frequency demultiplexers and the frequency combiners dedicated to each spot, by using the same distribution of the carriers. For each group of four spots, the different switches therefore make it possible, depending on their position, which can be modified by remote controls, to ensure all the possible distributions of the 12 available carriers between the four spots of the corresponding group. In the case where the groups of spots do not all have the same size and/or all have the same average number of carriers per spot, the selection and distribution devices dedicated to groups having a different number of spots and/or a different average number of carriers per spot, are different.

A table illustrating an example of the possible distributions of the number of carriers between the spots is represented in FIG. 4, for a group of four spots, a bandwidth DF for each channel split into a number N equal to four carriers and an average distribution K equal to three carriers per spot. On the first line of the table, the spot 1 has no carrier, the spots 2, 3 and 4 each comprise four carriers. This first possible distribution corresponds to the connections explicitly represented in FIG. 3. The other possible distributions represented on the other lines of the table of FIG. 4 can be produced by modifying the position of the switches 411, 412 of the selection and distribution device 391, 392.

Each selection and distribution device 391, 392 operates either in the low frequency band F1 or in the high frequency band F2. For an operation of the telecommunication system in two different high and low frequency bands, it is therefore necessary to have at least two groups of spots and two independent selection and distribution devices 391, 392, each selection and distribution device 391, 392 being dedicated to a frequency band. It is at the multispot antenna level that the choice of the polarization is made and that the transmission of the spots according to a four-colour scheme is performed.

Figure 5:
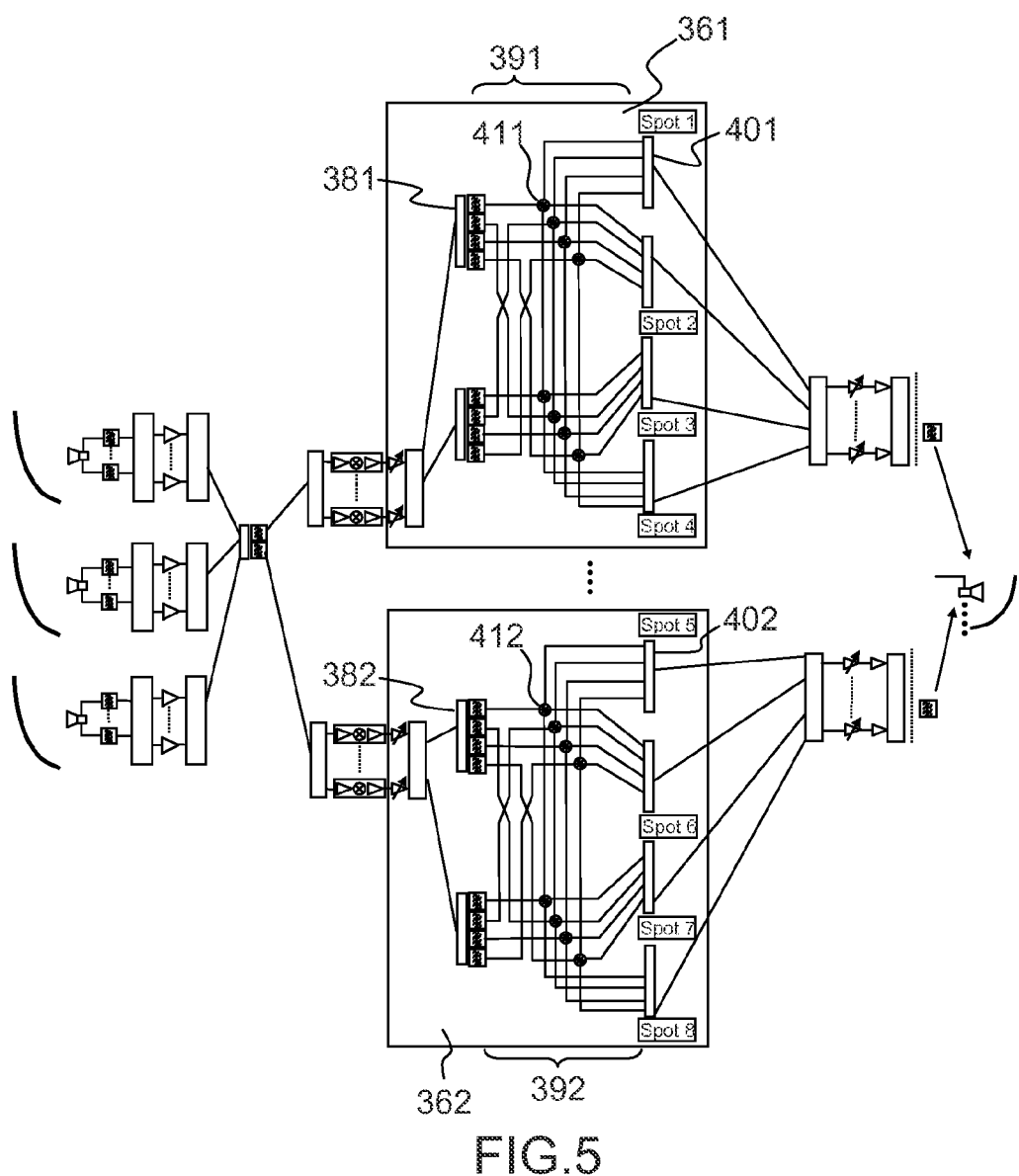
FIG. 5: a diagram illustrating an exemplary architecture of a telecommunication system illustrating a second exemplary spot generation device corresponding to a distribution of eight carriers between four spots, according to the invention.

FIG. 5 illustrates a second exemplary architecture comprising a spot generating device 361 in which the spots are considered in groups of four spots formed from two different frequency demultiplexers 381 each delivering four different carriers. The distribution of the eight carriers between the four spots corresponds to a choice of an average of two carriers per spot (N=4, K=2, C=4). Four different combiners 401 are respectively dedicated to the formation of the four spots. In this example, each switch 411 linked to the output of a frequency demultiplexer 381 comprises three positions. Two positions are respectively linked to two frequency combiners 401 chosen from the four different combiners, and the third position is linked to another switch with three positions, of which two positions are connected to the two other frequency combiners. Thus, the eight carriers delivered at the output of the two frequency demultiplexers of the selection and distribution device 391 are selected to feed the spots 1 to 4. All the possible distributions of the eight carriers between the four spots with an average of two carriers per spot are represented in the table of FIG. 6.

Figures 7, 8:
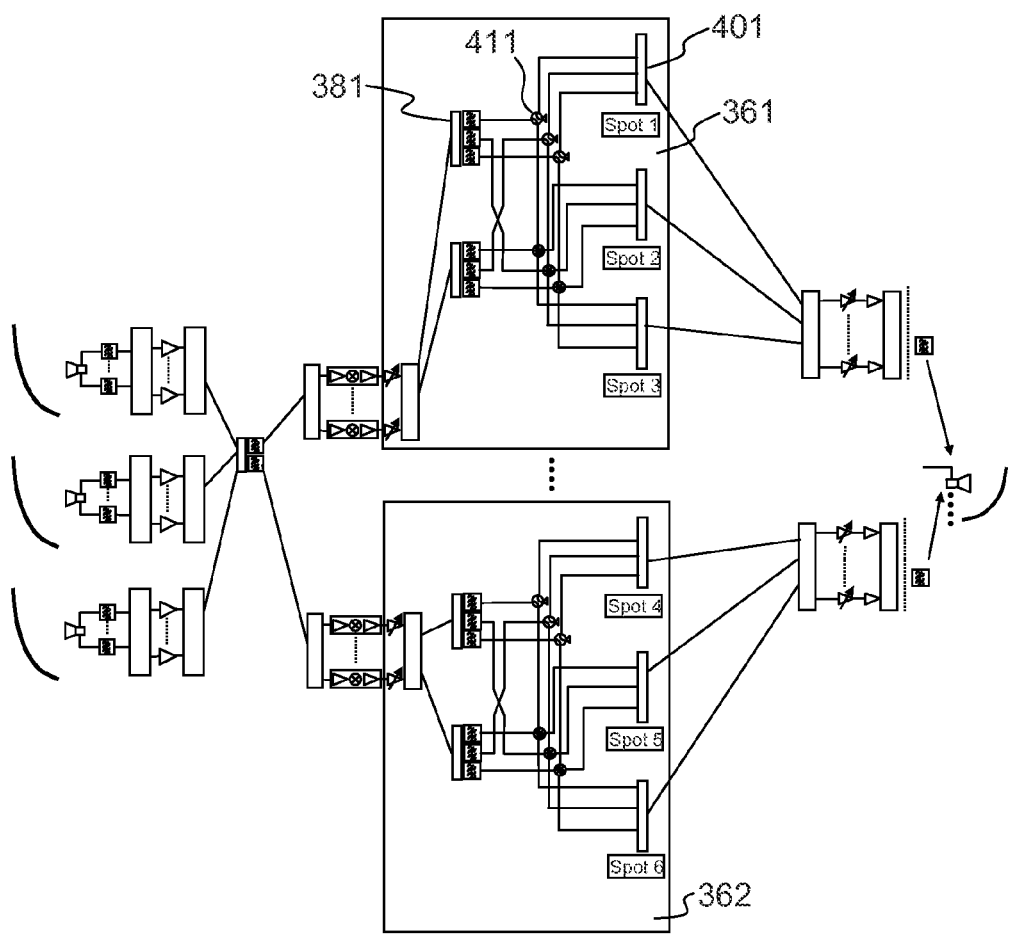
FIG. 7: a diagram illustrating an exemplary architecture of a telecommunication system illustrating a third exemplary spot generation device corresponding to a distribution of six carriers between three spots, according to the invention.
FIG. 8: a table illustrating all the possible combinations corresponding to a distribution of six carriers between three spots, according to the invention.

FIG. 7 illustrates a third exemplary architecture comprising a device for generating spots 361 in which the spots are considered in groups of three spots formed from two different frequency demultiplexers 381 each delivering three different carriers. The distribution of the six carriers between the three spots corresponds to a choice of an average of two carriers per spot (N=3, K=2, C=3). Three different frequency combiners 401 are respectively dedicated to the formation of the three spots. In this example, each switch 411 linked to the output of a frequency demultiplexer comprises two or three positions. The switches with two positions have one position connected to a first frequency combiner chosen from the three different combiners and one position linked to a switch with three positions of which two positions are connected to the two other frequency combiners. Thus, the six carriers delivered as output from the two frequency demultiplexers of the distribution matrix are selected to feed the spots 1 to 3. All the possible distributions of the six carriers between the three spots with an average of two carriers per spot are represented in the table of FIG. 8.

Figure 9A:
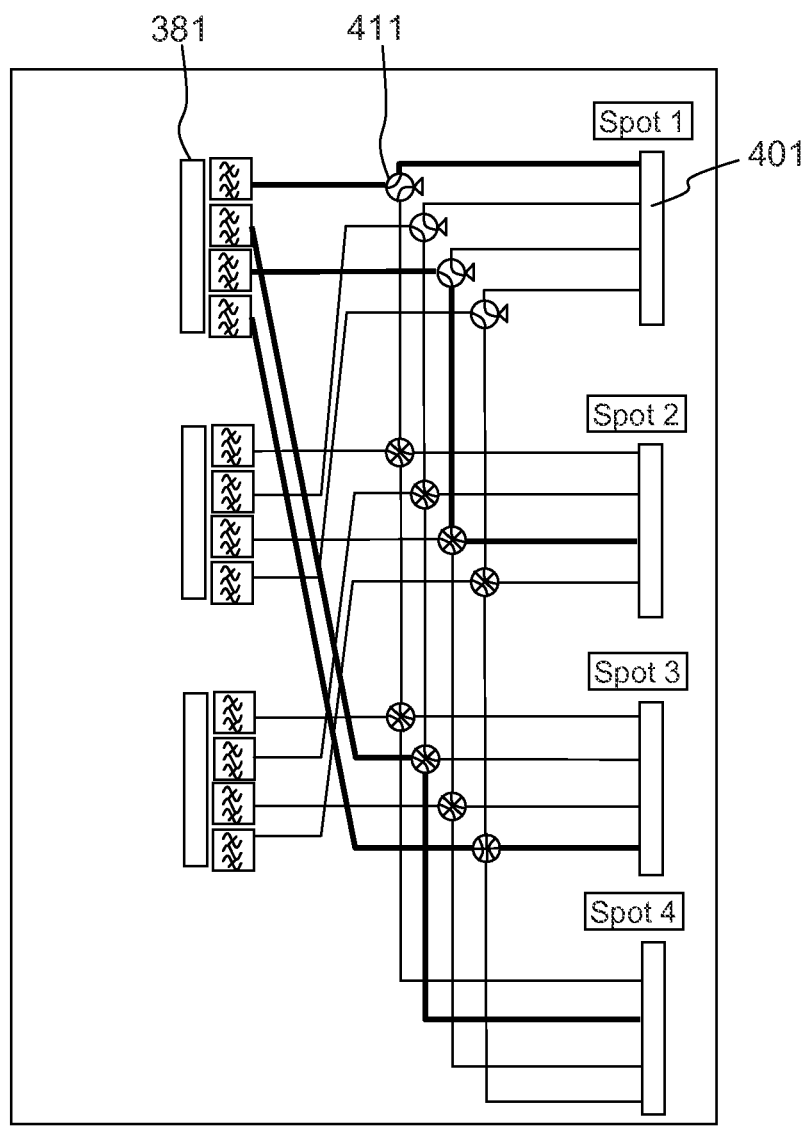
FIGS. 9a and 9b: two examples of selection and of distribution of the carriers suitable for a progressive deployment of the gateway stations, in cases corresponding to the first exemplary embodiment of the invention.
Figure 9B:
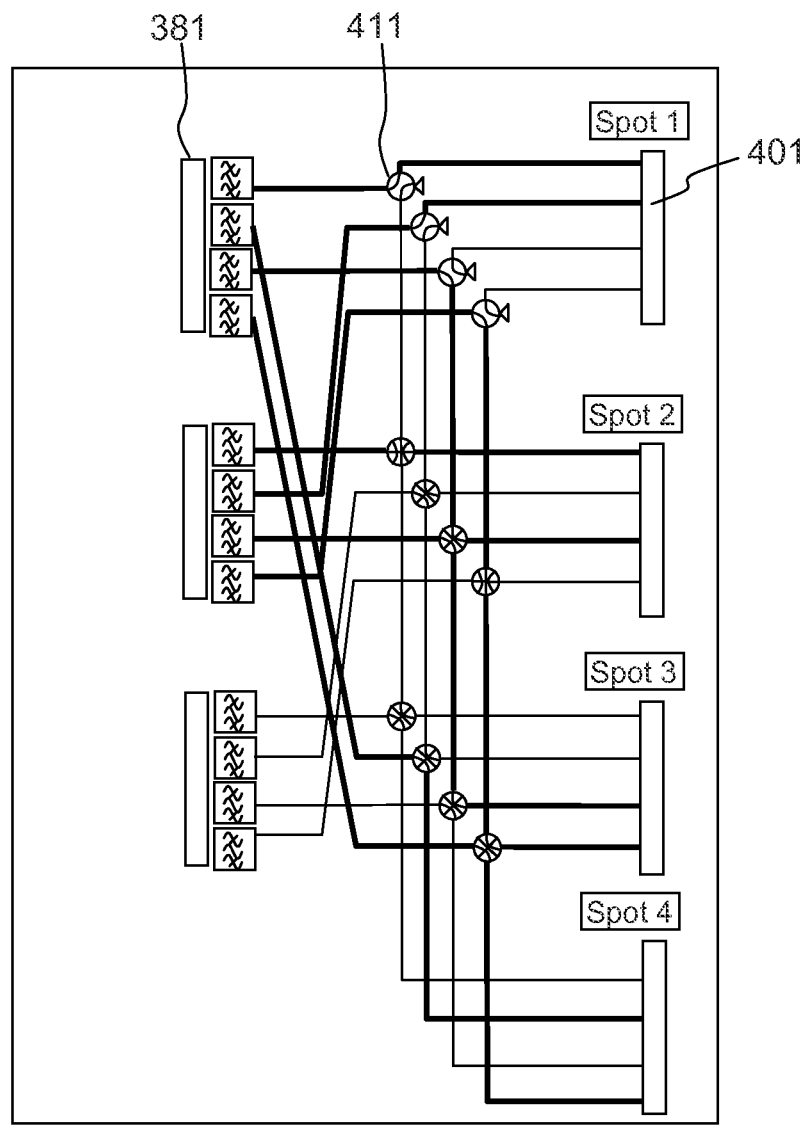

FIGS. 9a, 9b, 10, 11 illustrate four examples of a device 391 for selecting and distributing carriers suitable for progressive deployment of the gateway stations. In the launch phase of the telecommunication system, the operator may wish to start with a small number of gateway stations deployed on the ground and with a reduced capacity, while retaining the possibility of increasing the number of stations and the capacity subsequently. FIGS. 9a and 9b illustrate two examples corresponding to the diagram of FIG. 3, in a start up phase, according to which the number of gateway stations is reduced by two thirds for FIG. 9a and by one third for FIG. 9b. In these two FIGS. 9a and 9b, the sub-channels that are operational and fed by a carrier delivered as output from a demultiplexer are represented by thick lines and the channels represented by thin lines are not fed but are available if the needs of the telecommunication system increase and there is a desire to add additional gateway stations. In these two examples, N=4, K=3, C=4 and the distribution of the available capacity is uniform, but it is also possible to produce non-uniform distribution configurations of this reduced capacity. In FIG. 9a, the selection and distribution device 391 is identical to that represented in FIG. 3, but only the first demultiplexer 381 is fed by a reception signal and delivers four carriers on its four outputs. Each carrier is then assigned to one of the four spots depending on the position of the switches 11 connected between the outputs of the demultiplexer and the inputs of the four frequency combiners 401 intended to generate the four spots. In FIG. 9b, the selection and distribution device 391 is identical to the one represented in FIG. 3, but only the first and second demultiplexers are fed by a reception signal and deliver four carriers on their four respective outputs. Each carrier delivered by the two operational demultiplexers is then assigned to one of the four spots depending on the position of the switches connected between the outputs of the respective demultiplexers and the inputs of the four frequency combiners intended to generate the four spots.

Figure 10:
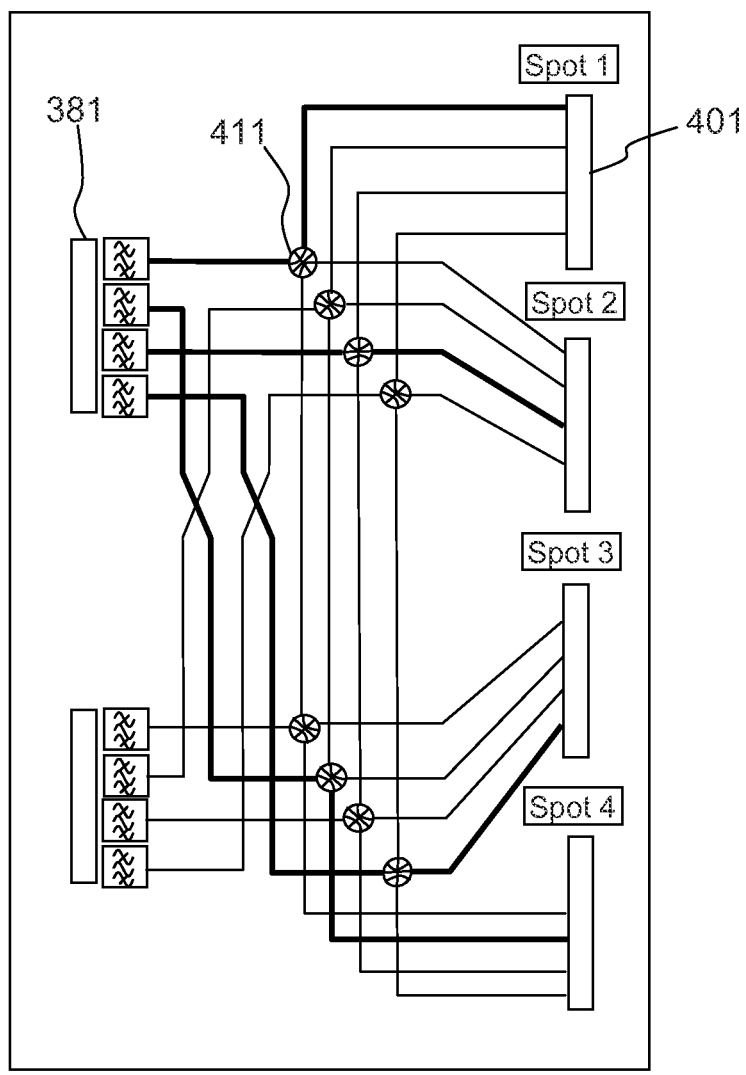
FIG. 10: an example of selection and of distribution of the carriers suitable for a progressive deployment of the gateway stations, in a case corresponding to the second exemplary embodiment of the invention.

FIG. 10 illustrates an example corresponding to the diagram of FIG. 5, in a start up phase according to which the number of gateway stations is reduced by half. In this example, N=4, K=2, C=4 and the distribution of the available capacity is uniform, but it is also possible to produce non-uniform distribution configurations of this reduced capacity. The corresponding selection and distribution device 391 is identical to the one represented in FIG. 5, but only the first demultiplexer 381 is fed by a reception signal and delivers four carriers on its four outputs. Each carrier is then assigned to one of the four spots depending on the position of the switches 411 connected between the outputs of the demultiplexer and the inputs of the four frequency combiners intended to generate the four spots.

Figure 11:
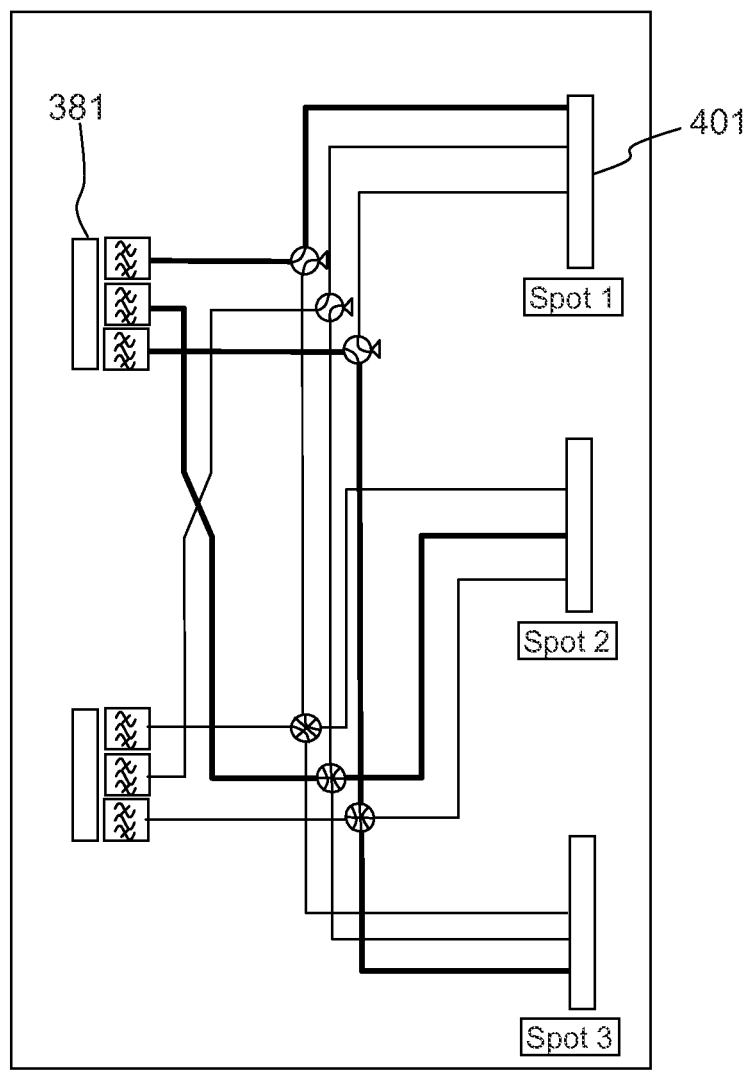
FIG. 11: an example of selection and of distribution of the carriers suitable for a progressive deployment of the gateway stations, in a case corresponding to the third exemplary embodiment of the invention.

FIG. 11 illustrates an example corresponding to the diagram of FIG. 7, in a start up phase according to which the number of gateway stations is reduced by half. In this example, N=3, K=2, C=3 and the distribution of the available capacity is uniform, but it is also possible to produce non-uniform distribution configurations of this reduced capacity. The selection and distribution device 391 is identical to the one represented in FIG. 7, but only the first demultiplexer is fed by a reception signal and delivers three carriers on its three outputs. Each carrier is then assigned to one of the three spots depending on the position of the switches connected between the outputs of the demultiplexer and the inputs of the three frequency combiners intended to generate the three spots.

Although the invention has been described in relation to particular embodiments, it is obvious that it is in no way limited thereto and that it includes all the technical equivalents of the means described and their combinations provided same fall within the scope of the invention.

The invention claimed is:

1. A satellite telecommunication system with multispot coverage and with variable capacity distribution, comprising:
   at least one gateway station associated with users located in different cells evenly distributed in a geographic coverage area,
   at least one repeater mounted on board a satellite and configured to relay radiofrequency signals between the at least one gateway station and the users, the at least one repeater configured to operate in a plurality of reception channels connected to at least one spot generation device, all the reception channels having an identical bandwidth, each spot covering a dedicated user cell,
   wherein the at least one spot generation device includes channel amplifiers with a variable gain and with a constant output and power to equalize power levels of all the reception channels, output power levels of all the channel amplifiers being constant and identical for all the reception channels,
   frequency demultiplexers respectively connected at an output of the channel amplifiers to split the bandwidth assigned to each of the reception channels into N sub-bands having a same width and corresponding to N different carriers, N being an integer greater than 1,
   at least one device for selecting and distributing all the carriers between all the spots, two adjacent carriers in a given reception channel being assigned to two different spots, and
   frequency combiners respectively dedicated to each of the two different spots to combine the carriers selected for a corresponding spot, a number of carriers assigned to each spot being variable from one spot to another spot as a function of usage needs of corresponding users,
   wherein the device for selecting and distributing carriers includes two-position switches and three-position switches, the switches selectively linking, depending on respective positions, each carrier to a frequency combiner chosen from amongst the frequency combiners.

2. A satellite telecommunication system with multispot coverage and with variable capacity distribution comprising:
   at least one gateway station associated with users located in different cells evenly distributed in a geographic coverage area,
   at least one repeater mounted on board a satellite and configured to relay radiofrequency signals between the at least one gateway station and the users, the at least one repeater configured to operate in a plurality of reception channels connected to at least one spot generation device, all the reception channels having an identical bandwidth, each spot covering a dedicated user cell,
   wherein the at least one spot generation device includes channel amplifiers with a variable gain and with a constant output and power to equalize power levels of all the reception channels, output power levels of all the channel amplifiers being constant and identical for all the reception channels,
   frequency demultiplexers respectively connected at an output of the channel amplifiers to split the bandwidth assigned to each of the reception channels into N sub-bands having a same width and corresponding to N different carriers, N being an integer greater than 1,
   at least one device for selecting and distributing all the carriers between all the spots, two adjacent carriers in a given reception channel being assigned to two different spots,
   frequency combiners respectively dedicated to each of the two different spots to combine the carriers selected for a corresponding spot, a number of carriers assigned to each spot being variable from one spot to another spot as a function of usage needs of corresponding users, and
   frequency converters dedicated to each of the reception channels to convert reception frequency bands into transmission frequency bands, the channel amplifiers being connected at an output of the frequency converters.

3. The satellite telecommunication system with multispot coverage and with variable capacity distribution according to claim 1, wherein each spot is assigned a dedicated number of carriers between 0 and N inclusive, an average number of carriers per spot being predefined and less than N, N being an integer greater than 1.

4. The satellite telecommunication system with multispot coverage and with variable capacity distribution comprising:
- at least one gateway station associated with users located in different cells evenly distributed in a geographic coverage area,
- at least one repeater mounted on board a satellite and configured to relay radiofrequency signals between the at least one gateway station and the users, the at least one repeater configured to operate in a plurality of reception channels connected to at least one spot generation device, all the reception channels having an identical bandwidth, each spot covering a dedicated user cell,
- wherein the at least one spot generation device includes channel amplifiers with a variable gain and with a constant output and power to equalize power levels of all the reception channels, output power levels of all the channel amplifiers being constant and identical for all the reception channels,
- frequency demultiplexers respectively connected at an output of the channel amplifiers to split the bandwidth assigned to each of the reception channels into N sub-bands having a same width and corresponding to N different carriers, N being an integer greater than 1,
- at least one device for selecting and distributing all the carriers between all the spots, two adjacent carriers in a given reception channel being assigned to two different spots, and
- frequency combiners respectively dedicated to each of the two different spots to combine the carriers selected for a corresponding spot, a number of carriers assigned to each spot being variable from one spot to another spot as a function of usage needs of corresponding users,
- wherein the spots are associated in a number of different groups, and wherein the spot generation device comprises a number of independent devices for selecting and distributing the carriers, each of said independent devices being dedicated to a group of spots.

5. The satellite telecommunication system with multispot coverage and with variable capacity distribution according to claim 4, wherein the different groups of spots comprise a same number of spots.

6. The satellite telecommunication system with multispot coverage and with variable capacity distribution according to claim 4, wherein each group of spots comprises a same average number of carriers per spot.

7. The satellite telecommunication system with multispot coverage and with variable capacity distribution according to claim 4, wherein the different groups of spots each have a different number of spots.

8. A satellite telecommunication method with multispot coverage and with variable capacity distribution between at least one gateway station and users located in different cells evenly distributed in a geographic coverage area, the method comprising:
- on board a satellite, relaying radiofrequency signals received over reception channels, between the at least one gateway station and the users,
- assigning a same bandwidth (DF) to each of the reception channels,
- equalizing power levels of all the reception channels,
- splitting the bandwidth DF assigned to each of the reception channels into N sub-bands having a same width (DP) corresponding to N carriers having different frequencies, N being an integer greater than 1,
- selecting and distributing all the carriers obtained between all the spots, two adjacent carriers in a reception channel being assigned to two different spots,
- for each spot, combining the corresponding selected carriers, a number of carriers assigned to each spot being variable from one spot to another spot according to usage needs of corresponding users, and
- associating the spots in a number of mutually independent different groups, and in selecting and distributing the carriers in each group of spots, independently of the other groups of spots.

9. The satellite telecommunication method with multispot coverage and with variable capacity distribution according to claim 8, wherein the number of carriers assigned to each spot is between 0 and N inclusive, the average number of carriers per spot being predefined and less than N, N being an integer greater than 1.

* * * * *